US008757200B2

(12) United States Patent
Davidson et al.

(10) Patent No.: US 8,757,200 B2
(45) Date of Patent: Jun. 24, 2014

(54) TIP-RESISTANT VALVE PLUGS

(75) Inventors: Warren Davidson, Troy, OH (US);
James Martin Jergens, Troy, OH (US)

(73) Assignee: West Troy, LLC, Troy, OH (US)

( * ) Notice: Subject to any disclaimer, the term of this patent is extended or adjusted under 35 U.S.C. 154(b) by 350 days.

(21) Appl. No.: 13/270,711

(22) Filed: Oct. 11, 2011

(65) Prior Publication Data

US 2012/0042969 A1 Feb. 23, 2012

Related U.S. Application Data

(66) Continuation of application No. PCT/US2011/048363, filed on Aug. 19, 2011, Substitute for application No. 61/375,501, filed on Aug. 20, 2010.

(51) Int. Cl.
*F16K 15/02* (2006.01)

(52) U.S. Cl.
USPC ............... 137/541; 137/543.17; 137/543.21; 210/130

(58) Field of Classification Search
CPC ..... F16K 15/00; F16K 15/021; F16K 15/025; F16K 15/026; F16K 15/028; F16K 17/12; B01D 27/103
USPC .......... 137/541, 542, 543.17, 543.19, 543.21, 137/533.17; 210/130
See application file for complete search history.

(56) References Cited

U.S. PATENT DOCUMENTS

| 758,377 | A | * | 4/1904 | Miller | 137/533.25 |
|---|---|---|---|---|---|
| 2,564,023 | A | * | 8/1951 | Miller | 137/533.17 |
| 2,870,576 | A | * | 1/1959 | Parker | 137/541 |
| 3,263,701 | A | * | 8/1966 | Johnson | 137/533.17 |
| 3,335,751 | A | * | 8/1967 | Davis, Jr. | 137/541 |
| 3,807,561 | A | * | 4/1974 | Cullis | 210/130 |
| 4,129,144 | A | | 12/1978 | Andersson et al. | |
| 4,935,127 | A | * | 6/1990 | Lowsky et al. | 210/130 |
| 4,990,247 | A | * | 2/1991 | Vandenberk | 210/130 |
| 5,250,176 | A | * | 10/1993 | Daniel | 210/130 |
| 6,284,130 | B1 | | 9/2001 | Daniel | |
| 2003/0015240 | A1 | * | 1/2003 | Nelson et al. | 137/541 |
| 2005/0103386 | A1 | | 5/2005 | Magda | |
| 2006/0201556 | A1 | | 9/2006 | Hamza | |

FOREIGN PATENT DOCUMENTS

JP 09-133233 A 5/1997

OTHER PUBLICATIONS

International Search Report and Written Opinion mailed Mar. 21, 2012 as it relates to PCT/US2011/048363.

* cited by examiner

*Primary Examiner* — John Rivell
(74) *Attorney, Agent, or Firm* — Dinsmore & Shohl LLP

(57) ABSTRACT

A tip-resistant valve plug includes a valve head, first and second retention legs, and an anti-tip fin. The valve head includes a continuous partition defining a fluid barrier between a sealing side and an external side of the valve head. Each of the first and second retention legs extend from a leg base positioned at the sealing side of the valve head to a distal end of the retention leg. Each of the first and second retention legs include a plug catch configured to interfere with an inside diameter of a fluid flow orifice or a pressure relief spring. The respective distal ends of the retention legs are spaced apart from one another, and the anti-tip fin extends from the sealing side of the valve head in a direction of the respective distal ends of the retention legs.

23 Claims, 5 Drawing Sheets

TIP-RESISTANT VALVE PLUGS

CROSS-REFERENCE TO RELATED APPLICATIONS

This application is a continuation of PCT Application PCT/US11/48363 filed Aug. 19, 2011, titled "Tip-Resistant Valve Plugs"; which claims priority to U.S. Provisional Application Ser. No. 61/375,501 filed Aug. 20, 2010, titled "Bypass Valve with Valve Head Fin."

BACKGROUND

The present disclosure is generally directed to bypass valves and, more specifically, bypass valves for pressure sensitive valve assemblies.

SUMMARY

Pressure sensitive valve assemblies allow fluid to bypass a valve to relieve pressure within a fluid handling line. Bypass valves for pressure sensitive valve assemblies move to an open position when internal pressure within the fluid handling line exceeds a threshold pressure, and return to a closed position when the internal pressure falls below the threshold pressure. The present inventor(s) has/have recognized that bypass valves have a tendency to misalign within a pressure sensitive valve assembly when moving between the open and closed positions. This misalignment can lead to improper sealing when the valve moves to the closed position The present inventors have also recognized that bypass valve elements can be subjected to significant interlocking when held in bulk storage. This interlocking can make it difficult to assemble valve assemblies using the interlocked valve elements. Embodiments of the present disclosure provide tip-resistant valve plugs that are generally not prone to disruptive interlocking in storage.

In one embodiment, a tip-resistant valve plug includes a valve head, first and second retention legs, and an anti-tip fin. The valve head includes a continuous partition defining a fluid barrier between a sealing side and an external side of the valve head. Each of the first and second retention legs extend from a leg base positioned at the sealing side of the valve head to a distal end of the retention leg. Each of the first and second retention legs include a plug catch configured to interfere with an inside diameter of a fluid flow orifice or a pressure relief spring. The respective distal ends of the retention legs are spaced apart from one another, and the anti-tip fin extends from the sealing side of the valve head in a direction of the respective distal ends of the retention legs.

In another embodiment, a tip-resistant valve plug includes a valve head, first and second retention legs, and an anti-tip fin. The valve head comprises a sealing side and the first and second retention legs extend from the sealing side of the valve head and are spaced apart from one another. The anti-tip fin extending across a portion of the valve head, where the anti-tip fin is located between the first retention leg and the second retention leg.

In yet another embodiment, a pressure sensitive valve assembly includes an orifice surround, a pressure relief spring, and a tip-resistant valve plug that includes a valve head, first and second retention legs, and an anti-tip fin. The orifice surround includes a fluid flow orifice and a reservoir side of the orifice surround. The valve head of the tip-resistant valve plug includes a continuous partition defining a fluid barrier between a sealing side and an external side of the valve head. Each of the first and second retention legs of the tip-resistant valve plug extend from a leg base positioned at the sealing side of the valve head to a distal end of the retention leg and each of the first and second retention legs of the tip-resistant valve plug comprise a plug catch configured to interfere with an inside diameter of the fluid flow orifice or the pressure relief spring. The respective distal ends of the retention legs of the tip-resistant valve plug are spaced apart from one another and the anti-tip fin of the tip-resistant valve plug extends from the sealing side of the valve head in the direction of the respective distal ends of the retention legs. The pressure relief spring contacts the retention legs of the tip-resistant valve plug and the reservoir side of the orifice surround and exerts a biasing force on the tip-resistant valve plug in a direction corresponding to moving the tip-resistant valve plug to a closed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 5:
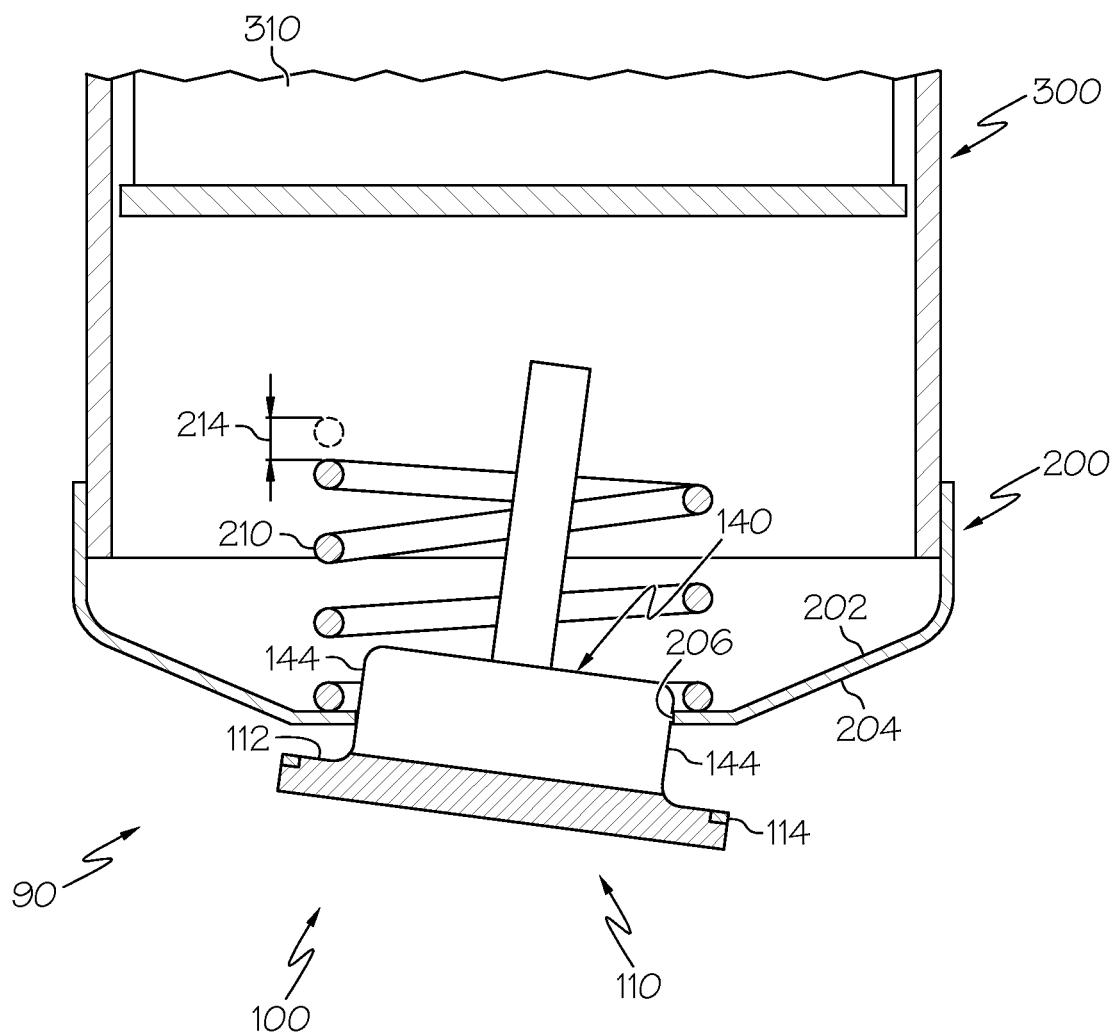
FIG. 5 depicts a right sectional view of pressure sensitive valve assembly of FIG. 3 along line B-B.

Embodiments described herein relate to tip-resistant valve plugs that are installed into an orifice surround with a compression spring to form a pressure sensitive valve assembly. The tip-resistant valve plugs according to the present disclosure may be used in a variety of applications to relieve pressure of fluid held in a reservoir. Referring to FIG. 5, one embodiment of a pressure sensitive valve assembly including a tip-resistant valve plug is depicted. The valve plug includes a valve head having a sealing side and an external side, two retention legs extending from the sealing side of the valve head, and an anti-tip fin that extends from the sealing side of the valve head. The retention legs are engaged with a pressure relief spring that applies a force to the valve plug through the retention legs in a direction corresponding to pressing the sealing side of the valve head against the orifice surround. As fluid pressure inside the reservoir increases, the valve plug moves to an open position. The anti-tip fin maintains the alignment of the valve plug within the fluid flow orifice and prevents the valve plug from tipping, which aids in sealing the valve plug with the orifice surround when the valve plug closes, all while allowing fluid to flow across the valve plug.

Figure 1:
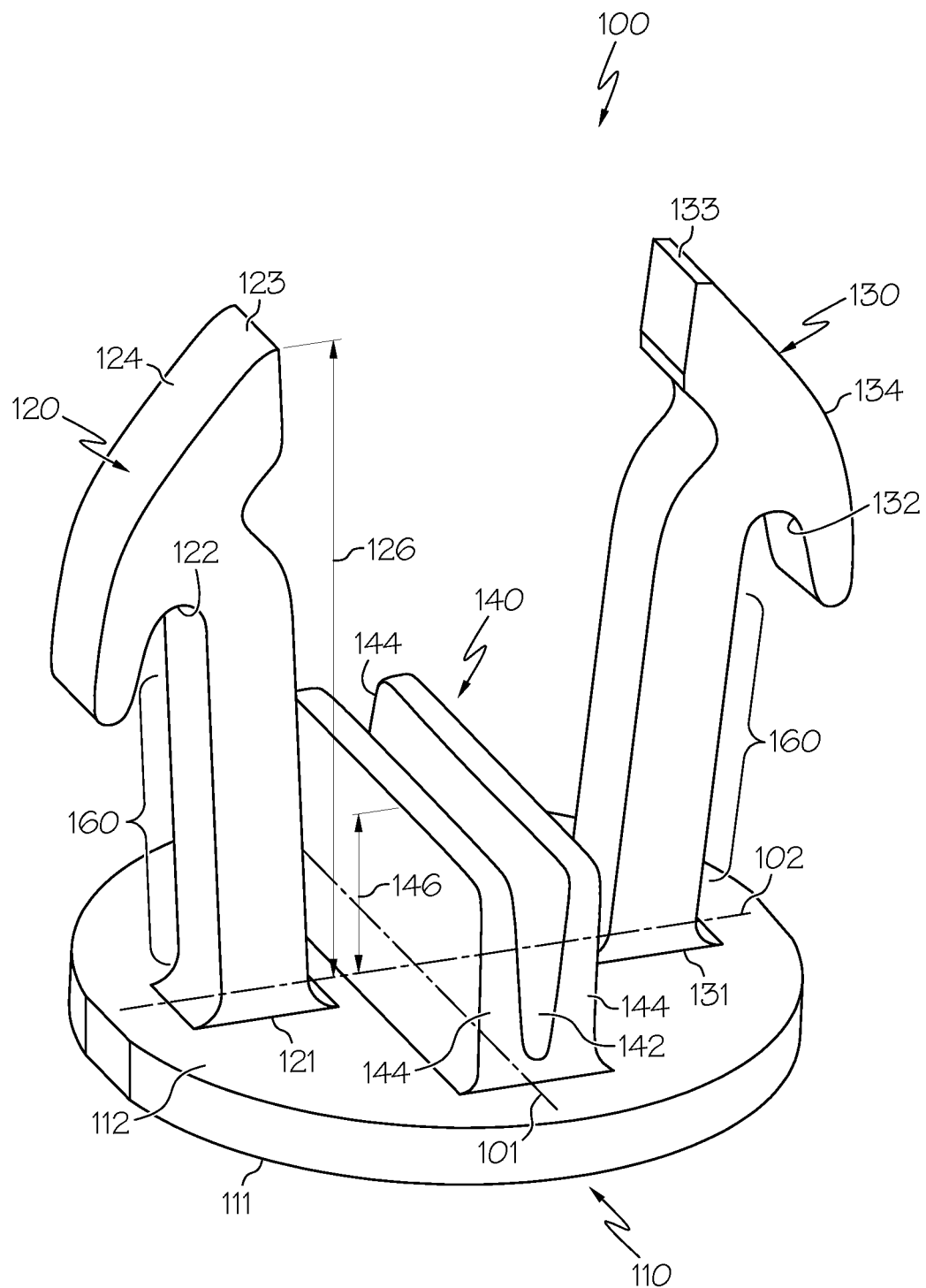
FIG. 1 depicts a front perspective view of a tip-resistant valve plug according to one or more embodiments shown and described herein.

Referring now to FIG. 1, one embodiment of the tip-resistant valve plug 100 is depicted. The tip-resistant valve plug 100 includes a valve head 110 that includes a continuous partition that defines a fluid barrier between a sealing side 112 and an external side 111 of the valve head 110. The tip-resistant valve plug 100 includes a first retention leg 120 that extends from a first leg base portion 121 positioned at the sealing side 112 of the valve head 110 to a first distal end 123. The tip-resistant valve plug 100 also includes a second retention leg 130 that extends from a second leg base portion 131 positioned at the sealing side 112 of the valve head 110 to a second distal end 133. The first distal end 123 of the first retention leg 120 is spaced apart from the second distal end 133 of the second retention leg 130. The tip-resistant valve plug 100 further includes an anti-tip fin 140 that extends from the sealing side 112 of the valve head 110 in the direction of the respective distal ends 123, 133 of the retention legs 120, 130.

In the embodiment of the tip-resistant valve plug 100 depicted in FIG. 1, a single anti-tip fin 140 extends across a portion of the sealing side 112 of the valve head 110. The first retention leg 120 and the second retention leg 130 are diametrically opposed from one another, and define a projection 102 passing through a center of the valve head 110. The single anti-tip fin 140 extends transverse to the projection 102. As depicted in FIG. 1, the anti-tip fin 140 is located between the first retention leg 120 and the second retention leg 130.

The anti-tip fin 140 comprises a groove 142 that extends along the anti-tip fin 140 that allows the valve head 110 to flex along a longitudinal fin axis 101. The valve head 110 has a smaller second moment of inertia evaluated in a direction the single anti-tip fin 140 extends across the valve head 110 (i.e., along longitudinal fin axis 101) than the second moment of inertia evaluated in a direction normal to the direction the single anti-tip fin 140 extends across the valve head 110 (i.e., along the projection 102). The valve head 110 is more flexible to bending to a force applied about the longitudinal fin axis 101 than a force applied about the projection 102. Flexibility of the valve head 110 encourages sealing of the sealing side 112 of the valve head 110 with an orifice surround 200. In addition, the anti-tip fin 140 reduces the distortion of the valve head 110 due to pressure applied to the valve head 110 by a fluid, as will be discussed below.

The anti-tip fin 140 includes fin shoulders 144 that face outwards and extend from the valve head 110 in a direction of the respective distal ends 123, 133 of the retention legs 120, 130. The fin shoulders 144 interact with the fluid flow orifice 206 to prevent the tip-resistant valve plug 100 from tipping, as will be discussed below.

The anti-tip fin 140 extends a fin height dimension 146 from the sealing side 112 of the valve head 110 at the fin shoulders 144. Similarly, the first retention leg 120 extends a leg height 126 from the sealing side 112 of the valve head 110. The fin height dimension 146 is at least approximately 10% of the leg height 126.

Some embodiments of the tip-resistant valve plug 100 according to the present disclosure include no more than two retention legs extending from the sealing surface 112 of the valve head 110. Each of the first retention leg 120 and the second retention leg 130 include a plug catch 122, 132 configured to interfere with an inside diameter of the fluid flow orifice or a pressure relief spring, as will be discussed below. The first retention leg 120 and the second retention leg 130 cooperate with the valve head 110 to define a spring retention zone 160 sized to accommodate a pressure relief spring between the plug catch 122, 132 and the sealing side 112 of the valve head 110.

Each retention leg 120, 130 includes a camming surface 124, 134 at the distal ends 123, 133 of the legs. The camming surfaces 124, 134 are oriented to encourage the retention legs 120, 130 to flex towards each other when engaged by a fluid flow orifice or a pressure relief spring, which define a camming diameter smaller than an unconstrained outside spacing diameter of the retention legs 120, 130.

Figure 2:
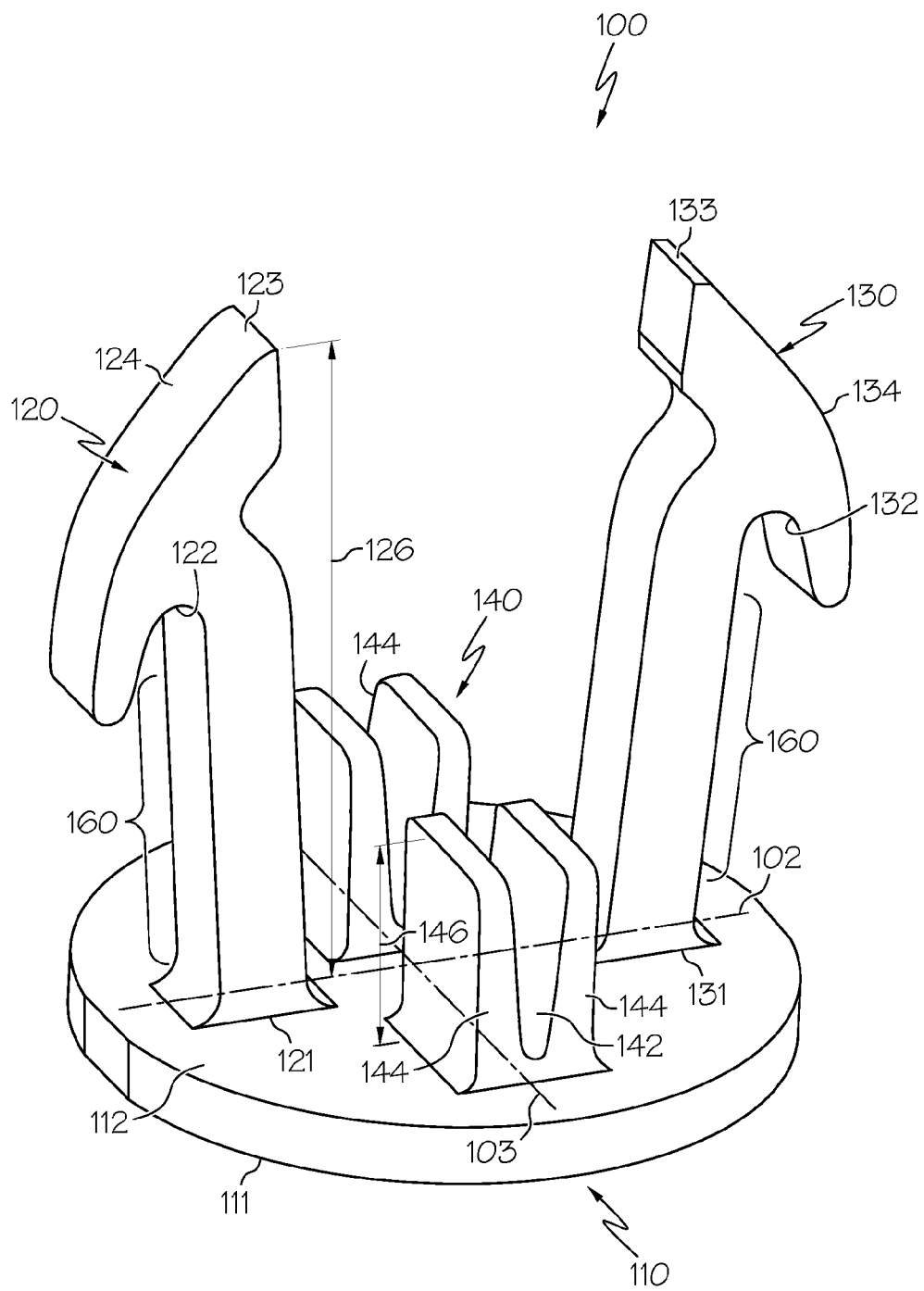
FIG. 2 depicts a front perspective view of a tip-resistant valve plug according to one or more embodiments shown and described herein.

Another embodiment of the tip-resistant valve plug 100 is depicted in FIG. 2. In this embodiment, the tip-resistant valve plug 100 includes a plurality of anti-tip fins 140 that extend from the sealing side 112 of the valve head 110. The plurality of anti-tip fins 140 are positioned along a common linear projection 103 across the sealing side 112 of the valve head 110. Alternately, the plurality of anti-tip fins 140 may be positioned along a plurality of intersection projections across the sealing side 112 of the valve head 110.

While the tip-resistant valve plugs 100 depicted in FIGS. 1 and 2 illustrate that the longitudinal fin axis 101 of the single anti-tip fin 140 and the common linear projection 103 of the plurality of ant-tip fins 140 extend generally orthogonally to the projection 102 of the first and second retention legs 120, 130, other orientations between the projection 102 and the longitudinal fin axis 101 or the common linear projection 103 are contemplated.

Tip-resistant valve plugs 100 according to the present disclosure may be made from a variety of materials according to a variety of manufacturing processes. The selection of material and manufacturing process used to produce the tip-resistant valve plugs 100 is determined in light of the requirements of the application in which the tip-resistant valve plugs 100 are used. The tip-resistant valve plugs 100 may include, but are not limited to, an elastomer, a polymer, or a metal. The tip-resistant valve plugs 100 may be made from a uniform material composition. This uniform material composition may define uniform stiffness properties. Alternatively, the tip-resistant valve plugs 100 may be made from a heterogeneous material composition. The heterogeneous material composition may have uniform stiffness properties or may have non-uniform stiffness properties. The tip-resistant valve plugs 100 may be made from a material having a varying density, for example having a higher density in regions local to the valve head 110 and a lower density in regions local to the distal ends 123, 133 of the first and second retention legs 120, 130. The tip-resistant valve plugs 100 may be made by manufacturing processes including, but not limited to, an injection molding process, a machining process, a casting process, a die-casting process, a forging process, a thermal-forming process, and a stereolithography process.

Some embodiments of the tip-resistant valve plugs 100 may include a mechanical seal 114 that extends from the sealing side 112 of the valve head 110 (see FIG. 5). The mechanical seal 114 may take a variety of forms including, but not limited to, an O-ring or a gasket. The mechanical seal 114 may be made from a material having lower stiffness properties than the valve head 110. In these embodiments, the mechanical seal 114 is relatively compliant to form a fluid-tight seal with an adjacent component, while the valve head 110 is relatively stiff to resist deformation due to an applied pressure. A tip-resistant valve plug 100 that includes a mechanical seal 114 may be produced by a co-molded injection molding process.

Figure 3:
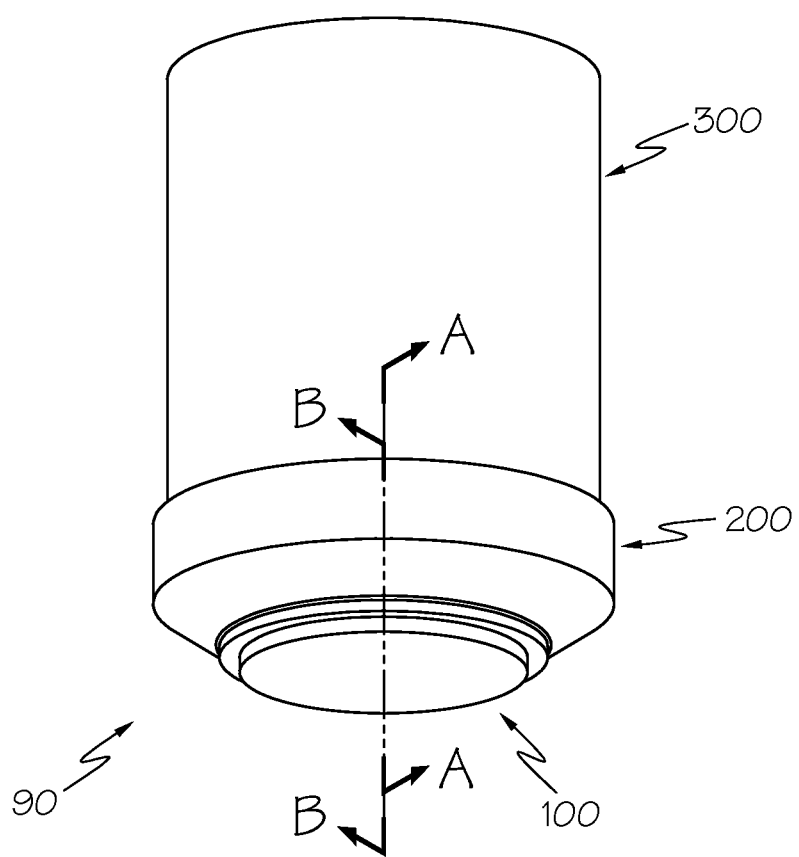
FIG. 3 depicts a front perspective view of a pressure sensitive valve assembly according to one or more embodiments shown and described herein.
Figure 4:
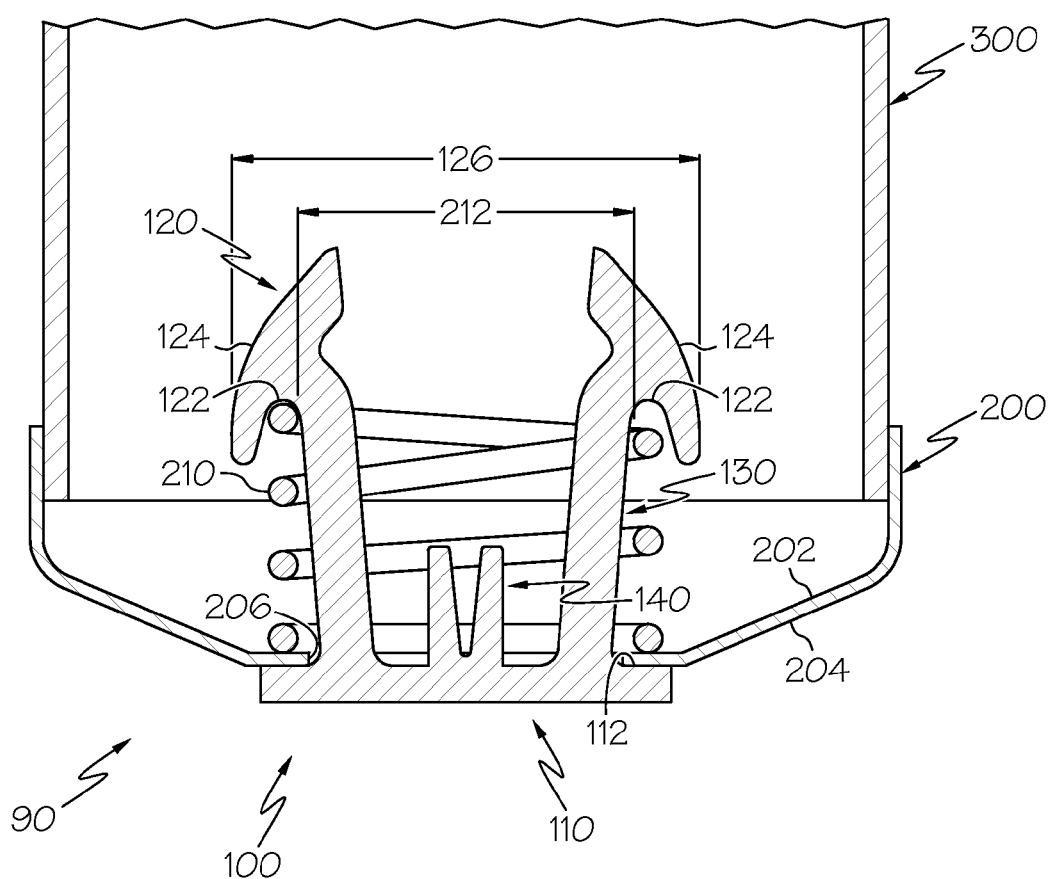
FIG. 4 depicts a front sectional view of the pressure sensitive valve assembly of FIG. 3 along line A-A.

Pressure sensitive valve assemblies 90 that include tip-resistant valve plugs 100 according to the present disclosure are depicted in FIGS. 3-5. A pressure sensitive valve assembly 90 includes a tip-resistant valve plug 100 that is inserted into an orifice surround 200. The orifice surround 200 is a member through which the fluid-flow orifice 206 passes. The orifice surround 200 is in fluid communication with a fluid reservoir 300 that is adapted to hold fluid at an elevated pressure. Examples of such fluids include, but are not limited to: gases, for example, air, carbon dioxide, carbon monoxide, or nitrogen; liquids, for example, water, liquid sewage, or liquid petroleum products; solids that flow, for example, sand or granulated fertilizer; combination gases-liquids; or combinations gases-liquids-solids.

The pressure sensitive valve assembly 90 depicted in FIG. 4 illustrates the tip-resistant valve plug 100 installed into the orifice surround 200. As is depicted, the unconstrained outside diameter 126 of the first retention leg 120 and the second retention leg 130 is larger than the fluid flow orifice 206 and the interior diameter of the pressure relief spring 210. The smaller of the fluid flow orifice 206 and the interior diameter of the pressure relief spring 210 define a camming diameter 212. To install the tip-resistant valve plug 100 into the pressure sensitive valve assembly 90, the camming surfaces 124, 134 of the retention legs 120, 130 encourage the retention legs 120, 130 to flex towards one another. With the tip-resistant valve plug 100 inserted through the fluid flow orifice 206 and the pressure relief spring 210, the plug catches 122, 132 of the respective retention legs 120, 130 may be positioned against the pressure relief spring 210.

The pressure relief spring 210 also contacts the reservoir side 202 of the orifice surround 200. The pressure relief spring 210 exerts a biasing force on the tip-resistant valve plug 100 in a direction corresponding to moving the tip-resistant valve plug 100 to a closed position. As depicted in FIG. 4, the sealing side 112 of the valve head 110 is pressed against the ambient side 204 of the orifice surround 200. The tip-resistant valve plug 100 forms a fluid-tight seal with ambient side 204 of the orifice surround 200.

The biasing force applied by the pressure relief spring 210 to the tip-resistant valve plug 100 is sufficient to maintain a fluid-tight seal with the orifice surround 200 until a blow-off pressure of the fluid inside the fluid reservoir 300 is reached. When the fluid inside the fluid reservoir 300 reaches the blow-off pressure, the fluid applies an opening force to the tip-resistant valve plug 100 that is greater than the biasing force exerted by the pressure relief spring 210. The opening force is sufficient to compress the pressure relief spring 210, which causes the tip-resistant valve plug 100 to move to an open position, as depicted in FIG. 5. The opening force of the pressure sensitive valve assembly 90 is determined by the surface area of the valve head 110, the biasing force exerted by the pressure relief spring 210, and application specific conditions (i.e., temperature, pressure, and flow rate, determined using standard engineering calculations) for the liquid or gas to be sealed by the tip-resistant valve plug 100. The intensity of the biasing force applied by the pressure relief spring 210 is determined by the spring constant of the pressure relief spring 210. For applications where higher fluid pressure within the fluid reservoir 300 is required, a pressure relief spring 210 having an increased spring constant may be used.

When the fluid inside the fluid reservoir 300 reaches the blow-off pressure, the tip-resistant valve plug 100 moves to an open position, compressing the pressure relief spring 210 a relief spring compression dimension 214 such that the sealing side 112 of the valve head 110 no long contacts the ambient side 204 of the orifice surround 200. Thus, in the open position, the tip-resistant valve plug 100 does not maintain a fluid-tight seal with the orifice surround 200. With the tip-resistant valve plug 100 located in the open position, fluid inside the fluid reservoir 300 is free to flow through the fluid flow orifice 206 around the first and second retention legs 120, 130 and the anti-tip fin 140. Because the tip-resistant valve plug 100 is held in relative position to the fluid flow orifice 206 by the pressure relief spring 210, the tip-resistant valve plug 100 will operate in any orientation. Thus, the tip-resistant valve pug 100 will move from a closed position to an open position without regard to the direction of gravity.

As is depicted in FIG. 5, the anti-tip fin 140, including the fin shoulders 144, interact with the fluid flow orifice 206 to prevent the tip-resistant valve plug 100 from tipping within the fluid flow orifice 206. The anti-tip fin 140 extends from the sealing side 112 of the valve head 110 to an extent sufficient to ensure that a portion of the anti-tip fin 140 is positioned within the reservoir side 202 of the orifice surround 200 when the tip-resistant valve plug 100 is located in the open position. In one embodiment, the anti-tip fin 140 extends from the sealing side 112 of the valve head 110 to a fin height dimension 146 (see FIG. 1) that is at least as much as the relief spring compression dimension 214 (see FIG. 5) caused by the tip-resistant valve plug 100 moving from the closed position to an open position. By maintaining the orientation of the tip-resistant valve plug 100 in the fluid flow orifice 206, the sealing side 112 of the tip-resistant valve plug 100 is encouraged to create a fluid-tight seal with the ambient side 204 of the orifice surround 200 when the tip-resistant valve plug 100 moves to a closed position.

By allowing the fluid to flow through the fluid flow orifice 206 and out of the fluid reservoir 300, the fluid inside the fluid reservoir 300 will be reduced. The tip-resistant valve plug 100 will remain in the open position until the biasing force exerted by the pressure relief spring 210 exceeds the opening force applied to the tip-resistant valve plug 100 by the fluid.

Tip-resistant valve plugs 100 according to the present disclosure may be used in a variety of applications where pressure of a fluid inside a fluid reservoir 300 is desired to be controlled. Examples of such applications include, but are not limited to, industrial, automotive, aviation, water lines, fuel lines, fluid or gas transfer, pumps, filters, HVAC, plumbing, storm sewers, water treatment facilities, and pipelines. When a fluid pressure in one of these systems exceeds a threshold pressure, the tip-resistant valve plugs 100 move to an open position to vent fluid, thereby reducing pressure inside the fluid reservoir 300.

The size of the features of the tip-resistant valve plugs 100, including the diameter of the valve head 110, the length and thickness of the first and second retention legs 120, 130, the height and thickness of the anti-tip fin 140, as well as the diameter of the fluid flow orifice 206 and the pressure relief spring 210 may vary depending on the requirements of the application in which the tip-resistant valve plug 100 will be integrated into.

As depicted in FIG. 5, the tip-resistant valve plug 100 may be placed in fluid communication with a fluid filtering element 310 disposed within the fluid reservoir 300. Examples of fluid filtering elements 310 include, but are not limited to, engine oil filters and vehicle power steering fluid filters. As the fluid filtering element 310 becomes clogged, the fluid inside the fluid reservoir 300 increases pressure. The tip-resistant valve plug 100 prevents the fluid inside the fluid reservoir 300 from exceeding a pre-determined maximum operating pressure.

Tip-resistant valve plugs 100 according to the present disclosure improve manufacturability and assembly of pressure sensitive valve assemblies 90. The spacing of the first retention leg 120 and the second retention leg 130 prevent tip-resistant valve plugs 100 from tangling and interlocking with one another when being transported or stored in bulk. Because the tip-resistant valve plugs 100 are not likely to tangle with one another, an automated assembly process may be used to install the tip-resistant valve plugs 100 into valve bodies 200. Tip-resistant valve plugs 100 according to the present disclosure may therefore reduce the cost of producing pressure sensitive valve assemblies 90. Additionally, the anti-tip fin 140 positions the center of gravity of the tip-resistant valve plug 100 closer to the valve head 110 as compared with valve plugs that do not include the anti-tip fin 140. By shifting the position of the center of gravity towards the valve head 110, the tip-resistant valve plug 100 behaves in a predictable manner when placed in a machine that aligns the tip-resistant valve plugs 100 for automated assembly, for example when placed on a vibration table.

It should now be understood that tip-resistant valve plugs according to the present disclosure are installed into pressure sensitive valve assemblies that are configured to open the valve plug when an internal pressure is achieved. The tip-resistant valve plug includes an anti-tip fin that interacts with the orifice surround to prevent the valve plug from binding with the orifice surround when the valve plug moves from a closed position to an open position. The anti-tip fin includes fin shoulders that face outwards and interact with a fluid flow orifice of the orifice surround to limit tipping of the valve plug. The anti-tip fin extends a distance from the sealing side of the valve face such that at least a portion of the anti-tip fin remains positioned within the reservoir side of the orifice surround when the valve plug is located in the open position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tip-resistant valve plug comprising a valve head, first and second retention legs, and an anti-tip fin, wherein:
   the valve head comprises a continuous partition defining a fluid barrier between a sealing side and an external side of the valve head;
   each of the first and second retention legs extend from a leg base positioned at the sealing side of the valve head to a distal end of the retention leg;
   each of the first and second retention legs comprise a plug catch configured to interfere with an inside diameter of a fluid flow orifice or a pressure relief spring;
   the respective distal ends of the retention legs are spaced apart from one another;
   the anti-tip fin extends from the sealing side of the valve head in a direction of the respective distal ends of the retention legs;
   the tip-resistant valve plug comprises a single anti-tip fin or a plurality of anti-tip fins extending from the sealing side of the valve head; and
   the valve head has a smaller moment of inertia evaluated in a direction the single anti-tip fin extends across the valve head than a moment of inertia evaluated in a direction normal to the direction the single anti-tip fin extends across the valve head.

2. The tip-resistant valve plug of claim 1, wherein the single anti-tip fin or the plurality of anti-tip fins are positioned along a common linear projection across the sealing side of the valve head or along a plurality of intersection projections across the sealing side of the valve head.

3. The tip-resistant valve plug of claim 1, wherein:
   the first retention leg and the second retention leg are diametrically opposed from one another;
   the first retention leg and the second retention leg define a projection passing through a center of the valve head; and
   the anti-tip fin extends transverse to the projection.

4. The tip-resistant valve plug of claim 1, wherein the anti-tip fin comprises fin shoulders that face outwards and extend from the valve head in the direction of the respective distal ends of the retention legs.

5. The tip-resistant valve plug of claim 4, wherein:
   the anti-tip fin extends a fin height from the sealing side of the valve head at the fin shoulders;
   the first retention leg extends a leg height from the sealing side of the valve head; and
   the fin height is at least approximately 10% of the leg height.

6. The tip-resistant valve plug of claim 1, wherein the tip-resistant valve plug further comprises a mechanical seal extending from the sealing side of the valve head.

7. The tip-resistant valve plug of claim 1, wherein:
   each of the retention legs comprises a camming surface at the respective distal ends of the retention legs;
   the camming surfaces are oriented to encourage the retention legs to flex towards each other when engaged by the fluid flow orifice or the pressure relief spring defining a camming diameter smaller than an unconstrained outside spacing diameter of the distal ends of the retention legs.

8. The tip-resistant valve plug of claim 1, wherein the tip-resistant valve plug comprises no more than two retention legs extending from the sealing side of the valve head.

9. The tip-resistant valve plug of claim 1, wherein the first retention leg and the second retention leg cooperate with the valve head to define a spring retention zone sized to accommodate the pressure relief spring between respective plug catches located along the retention legs and the valve head.

10. The tip-resistant valve plug of claim 1, wherein the tip-resistant valve plug comprises an elastomer, a polymer, or a metal.

11. The tip-resistant valve plug of claim 1, wherein the tip-resistant valve plug comprises a uniform material composition defining uniform stiffness properties.

12. A tip-resistant valve plug comprising a valve head, first and second retention legs, and an anti-tip fin, wherein:
   the valve head comprises a continuous partition defining a fluid barrier between a sealing side and an external side of the valve head;
   each of the first and second retention legs extend from a leg base positioned at the sealing side of the valve head to a distal end of the retention leg;
   each of the first and second retention legs comprise a plug catch configured to interfere with an inside diameter of a fluid flow orifice or a pressure relief spring;
   the respective distal ends of the retention legs are spaced apart from one another;

the anti-tip fin extends from the sealing side of the valve head in a direction of the respective distal ends of the retention legs; and the anti-tip fin comprises a groove extending along the anti-tip fin that allows the valve head to flex along a longitudinal fin axis.

13. A pressure sensitive valve assembly comprising an orifice surround, a pressure relief spring, and a tip-resistant valve plug comprising a valve head, first and second retention legs, and an anti-tip fin, wherein:

the orifice surround comprises a fluid flow orifice and a reservoir side of the orifice surround;

the valve head of the tip-resistant valve plug comprises a continuous partition defining a fluid barrier between a sealing side and an external side of the valve head;

each of the first and second retention legs of the tip-resistant valve plug extend from a leg base positioned at the sealing side of the valve head to a distal end of the retention leg;

each of the first and second retention legs of the tip-resistant valve plug comprise a plug catch configured to interfere with an inside diameter of the fluid flow orifice or the pressure relief spring;

the respective distal ends of the retention legs of the tip-resistant valve plug are spaced apart from one another;

the anti-tip fin of the tip-resistant valve plug extends from the sealing side of the valve head in the direction of the respective distal ends of the retention legs; and the pressure relief spring contacts the retention legs of the tip-resistant valve plug and the reservoir side of the orifice surround and exerts a biasing force on the tip-resistant valve plug in a direction corresponding to moving the tip-resistant valve plug to a closed position; and the anti-tip fin extends from the sealing side of the valve head to a fin height dimension that is greater than a relief spring compression dimension caused by the tip-resistant valve plug moving from the closed position to an open position.

14. The pressure sensitive valve assembly of claim 13, wherein the anti-tip fin extends from the sealing side of the valve head to an extent sufficient to ensure that a portion of the anti-tip fin is positioned within the reservoir side of the orifice surround when the tip-resistant valve plug is located in an open position.

15. The pressure sensitive valve assembly of claim 13, wherein an unconstrained outside spacing diameter of the distal ends of the first and second retention legs is larger than a diameter of the fluid flow orifice.

16. The pressure sensitive valve assembly of claim 13, wherein the pressure sensitive valve assembly is in fluid communication with a fluid reservoir that is adapted to hold fluid at an elevated pressure.

17. The pressure sensitive valve assembly of claim 16, wherein a fluid filtering element is disposed inside the fluid reservoir.

18. A tip-resistant valve plug comprising a valve head, first and second retention legs, and an anti-tip fin, wherein:

the valve head comprises a continuous partition defining a fluid barrier;

each of the first and second retention legs extend from a leg base to a distal end of the retention leg;

the leg base is positioned at one side of the valve head;

each of the first and second retention legs comprise a plug catch configured to interfere with an inside diameter of a fluid flow orifice or a pressure relief spring;

the respective distal ends of the retention legs are spaced apart from one another;

the anti-tip fin extends from the valve head in a direction of the respective distal ends of the retention legs; and the valve head has a smaller moment of inertia evaluated in a direction the single anti-tip fin extends across the valve head than a moment of inertia evaluated in a direction normal to the direction the single anti-tip fin extends across the valve head.

19. A pressure sensitive valve assembly comprising an orifice surround, a pressure relief spring, and a tip-resistant valve plug comprising a valve head, first and second retention legs, and an anti-tip fin, wherein:

the orifice surround comprises a fluid flow orifice;

the valve head of the tip-resistant valve plug comprises a continuous partition defining a fluid barrier;

each of the first and second retention legs of the tip-resistant valve plug extend from a leg base to a distal end of the retention leg;

the leg base is positioned at one side of the valve head;

each of the first and second retention legs of the tip-resistant valve plug comprise a plug catch configured to interfere with an inside diameter of the fluid flow orifice or the pressure relief spring;

the respective distal ends of the retention legs of the tip-resistant valve plug are spaced apart from one another;

the anti-tip fin of the tip-resistant valve plug extends from the valve head in the direction of the respective distal ends of the retention legs;

the pressure relief spring contacts the retention legs of the tip-resistant valve plug and the orifice surround and exerts a biasing force on the tip-resistant valve plug in a direction corresponding to moving the tip-resistant valve plug to a closed position; and the valve head has a smaller moment of inertia evaluated in a direction the single anti-tip fin extends across the valve head than a moment of inertia evaluated in a direction normal to the direction the single anti-tip fin extends across the valve head.

20. A tip-resistant valve plug comprising a valve head, first and second retention legs, and an anti-tip fin, wherein:

the valve head comprises a continuous partition defining a fluid barrier;

each of the first and second retention legs extend from a leg base to a distal end of the retention leg;

the leg base is positioned at one side of the valve head;

each of the first and second retention legs comprise a plug catch configured to interfere with an inside diameter of a fluid flow orifice or a pressure relief spring;

the respective distal ends of the retention legs are spaced apart from one another;

the anti-tip fin extends from the valve head in a direction of the respective distal ends of the retention legs; and the anti-tip fin comprises a groove extending along the anti-tip fin that allows the valve head to flex along a longitudinal fin axis.

21. A tip-resistant valve plug comprising a valve head, first and second retention legs, and an anti-tip fin, wherein:

the valve head comprises a continuous partition defining a fluid barrier;

each of the first and second retention legs extend from a leg base to a distal end of the retention leg;

the leg base is positioned at one side of the valve head;

each of the first and second retention legs comprise a plug catch configured to interfere with an inside diameter of a fluid flow orifice or a pressure relief spring;

the respective distal ends of the retention legs are spaced apart from one another;

the anti-tip fin extends from the valve head in a direction of the respective distal ends of the retention legs; and the anti-tip fin extends from the sealing side of the valve head to a fin height dimension that is greater than a relief spring compression dimension caused by the tip-resistant valve plug moving from a closed position to an open position.

22. A pressure sensitive valve assembly comprising an orifice surround, a pressure relief spring, and a tip-resistant valve plug comprising a valve head, first and second retention legs, and an anti-tip fin, wherein:

the orifice surround comprises a fluid flow orifice;

the valve head of the tip-resistant valve plug comprises a continuous partition defining a fluid barrier;

each of the first and second retention legs of the tip-resistant valve plug extend from a leg base to a distal end of the retention leg;

the leg base is positioned at one side of the valve head;

each of the first and second retention legs of the tip-resistant valve plug comprise a plug catch configured to interfere with an inside diameter of the fluid flow orifice or the pressure relief spring;

the respective distal ends of the retention legs of the tip-resistant valve plug are spaced apart from one another;

the anti-tip fin of the tip-resistant valve plug extends from the valve head in the direction of the respective distal ends of the retention legs;

the anti-tip fin comprises a groove extending along the anti-tip fin that allows the valve head to flex along a longitudinal fin axis; and the pressure relief spring contacts the retention legs of the tip-resistant valve plug and the orifice surround and exerts a biasing force on the tip-resistant valve plug in a direction corresponding to moving the tip-resistant valve plug to a closed position.

23. A pressure sensitive valve assembly comprising an orifice surround, a pressure relief spring, and a tip-resistant valve plug comprising a valve head, first and second retention legs, and an anti-tip fin, wherein:

the orifice surround comprises a fluid flow orifice;

the valve head of the tip-resistant valve plug comprises a continuous partition defining a fluid barrier;

each of the first and second retention legs of the tip-resistant valve plug extend from a leg base to a distal end of the retention leg;

the leg base is positioned at one side of the valve head;

each of the first and second retention legs of the tip-resistant valve plug comprise a plug catch configured to interfere with an inside diameter of the fluid flow orifice or the pressure relief spring;

the respective distal ends of the retention legs of the tip-resistant valve plug are spaced apart from one another;

the anti-tip fin of the tip-resistant valve plug extends from the valve head in the direction of the respective distal ends of the retention legs;

the pressure relief spring contacts the retention legs of the tip-resistant valve plug and the orifice surround and exerts a biasing force on the tip-resistant valve plug in a direction corresponding to moving the tip-resistant valve plug to a closed position; and the anti-tip fin extends from the sealing side of the valve head to a fin height dimension that is greater than a relief spring compression dimension caused by the tip-resistant valve plug moving from the closed position to an open position.

* * * * *